United States Patent [19]

Eden

[11] 4,283,113
[45] Aug. 11, 1981

[54] OPTICAL MODULATION WITH VANADIUM OXIDE THIN FILMS

[76] Inventor: Dayton D. Eden, 6827 Meadow Creek, Dallas, Tex. 75240

[21] Appl. No.: 23,221

[22] Filed: Mar. 23, 1979

[51] Int. Cl.³ .......................... G02B 5/14; G01C 3/08
[52] U.S. Cl. .................................... 350/96.15; 332/4; 350/353; 356/5
[58] Field of Search .................. 350/96.15, 96.16, 290, 350/353; 356/5; 357/4; 332/4

[56] References Cited

U.S. PATENT DOCUMENTS

| | | | |
|---|---|---|---|
| 3,484,722 | 12/1969 | Barker, Jr. et al. | 332/4 |
| 3,497,286 | 2/1970 | Morton et al. | 350/353 |
| 3,509,348 | 4/1970 | Boyle et al. | 350/353 X |
| 3,664,726 | 5/1972 | Mattis | 350/353 |
| 3,789,420 | 1/1974 | Claytor et al. | 350/353 X |
| 3,831,165 | 8/1974 | Chivian et al. | 350/353 X |
| 3,870,396 | 3/1975 | Racki et al. | 350/96.16 |
| 3,874,779 | 4/1975 | Thiel | 350/96.16 |
| 3,977,764 | 8/1976 | d'Auria et al. | 350/96.16 |
| 3,993,400 | 11/1976 | Leib | 350/96.15 |
| 4,068,952 | 1/1978 | Erbert et al. | 356/5 |

OTHER PUBLICATIONS

Weiser et al., "Optically Erasing a Thermally Biased Thermally Switchable Film", *IBM Tech. Disc. Bull.*, vol. 16, No. 7, Dec. 1973, pp. 2075-2076.

*Primary Examiner*—John K. Corbin
*Assistant Examiner*—John D. Lee

[57] ABSTRACT

The specification discloses apparatus for switching light between optical fibers.

A vanadium oxide thin film (28), switchable between high reflectance and high transmission states, is provided for switching a modulated light signal (14) between optical fibers. An input optical fiber (10) carries the modulated signal which is incident on the surface film (28). The signal is transmitted through the film in its transmitting state into a first output optical fiber (20) disposed behind the film. When the film is switched to its reflecting state the signal is reflected into a second output fiber (18) disposed at an appropriate angle to the film. A series of thermoelectric junctions (30) are positioned in thermal contact with the film for selectively heating and cooling the film above or below its transition temperature to switch the film between its transmission and reflecting states. A control device (32) selectively switches current to or from the junctions for switching the film between states.

11 Claims, 4 Drawing Figures

OPTICAL MODULATION WITH VANADIUM OXIDE THIN FILMS

TECHNICAL FIELD

This invention relates to modulation of light with thermochromic materials and more particularly the modulation of light with optical beam splitters using vanadium oxide thin films.

BACKGROUND ART

Thermochromic materials exhibit changes in physical properties such as electrical conductivity, absorption, reflectance and refractive index as the result of thermodynamic state changes between the semiconductor and metal state. Thermochromic materials, such as certain vanadium oxides and titanium oxides, have relatively low absorption in the semiconductor state and high absorption and high reflectance in the metal state.

The thermodynamic transitions between the semiconductor and metal states are reversible and take place sufficiently rapidly that thin films of such materials are feasible as optical modulators. For example, U.S. Pat. No. 3,664,726 to Mattis, U.S. Pat. No. 3,484,722 to Barker and U.S. Pat. No. 3,497,286 to Morton disclose devices in which such materials are used for modulating light. However, none of these devices exploit both the high transmission characteristics of these materials in the semiconductor state and the high reflectance properties of these materials in the metal state. Exploitation of both properties by the present invention makes it possible to use these materials in high speed beam splitters, which have applications in the switching between optical fibers, the tapping of optical fibers, and in a transmit-receive switch for a laser radar.

DISCLOSURE OF THE INVENTION

In accordance with the present invention, apparatus is disclosed for modulating light with vanadium oxide thin films.

In accordance with one embodiment of the present invention, a bistable vanadium dioxide thin film is provided for switching light between optical fibers. The film is designed to reflect substantially all light incident thereon when the film is in its metal (high absorption) state and is made sufficiently thin as to transmit substantially all light incident thereon when the film is in its semiconductor (low absorption) state. The input optical fiber is positioned forward of the film such that a modulated light signal carried by the input fiber is incident on the surface of the film. First and second output optical fibers are provided for selectively receiving light from the input fiber. The first output fiber is disposed behind the film and aligned relative to the input fiber such that light from the input fiber incident on the film in its semiconductor state passes through the film into the first output fiber. The second output fiber is disposed at an angle to the film such that light from the input fiber incident on the film in its reflecting state is reflected into the second output fiber. Thermoelectric junctions are provided around the edge of the film for selectively heating or cooling the film above or below its transition temperature to switch the film between its semiconductor and metal states, thereby directing the incident light into the first or second output fibers. A control device selectively switches a current to or from the junctions for swtching the film between its transmission and reflection modes.

In accordance with a second embodiment of the present invention, a transmit-receive switch for an optical radar is provided. A vanadium dioxide thin film is disposed in the path of an infrared pulsed laser. The film is capable of transmitting substantially all light incident thereon when the film is in its semiconductor state and reflecting substantially all incident light when the film is in its metal state. Switching between the semiconductor and metal states occurs by varying the temperature of the film above or below its transition temperature. An oscillator is connected to the laser for obtaining a pulsed laser signal and for selectively switching the film between its semiconductor and metal states such that when the transmitted laser pulse is incident on the film, the film is in its metal state and reflects the pulse out of the system and when a reflected pulse returns to the system, the film will be in its semiconductor state, permitting the reflected pulse to be transmitted through the film to be detected by a sensor.

DETAILED DESCRIPTION

Materials which exhibit marked changes in reflectance with changes in temperature are known as thermochromic materials. Compounds, such as certain ternary halides, ternary mono chalcogenides and certain transition metal oxides, such as certain vanadium oxides and titanium oxides, exhibit these properties.

As a result of thermodynamic phase transitions from the semiconductor to metal states, certain vanadium oxides and titanium oxides undergo marked changes in physical properties, such as reflectance, electrical conductivity and refractive index. In thin films of such materials, hysteresis effects are observed in these physical properties analogous to the ferromagnetic "memory" effects observed in certain ferromagnetic materials. These particular thermochromic materials have found applications in information displays and storage, as well as in the modulation of optical signals.

The thermochromic properties of these vanadium oxides and titanium oxides are usually exploited by making thin films of these materials containing large numbers of crystallites by conventional processes such as vacuum deposition. In future discussion of the characteristics and applications of these films, it will be convenient to speak of "vanadium oxide thin films" or "VOTF". As these terms are used, they refer to one of the titanium oxides ($Ti_4O_7$) and any of the vanadium oxides: vanadium dioxide ($VO_2$), vanadium sesquioxide ($V_2O_3$) and another vanadium oxide ($V_3O_5$).

Moreover, these state transitions for vanadium oxide thin films are thermodynamically reversible; when the temperature of a film in the reflecting or metal state is decreased, the film returns to its transparent or semiconductor state. Because the transition between successive states can be fairly rapid, on the order of ½ millisecond in the applications discussed herein, it is appropriate to speak of "switching" these films from one state to the other.

Due to the strain sets present in the vanadium oxide thin films, each individual crystallite is switched at a slightly different transition temperature. As the temperature of the film is increased, an increasing number of crystallites will be switched from the semiconductor to metal state as the transition temperatures of the individual crystallites are exceeded. Macroscopically, the film will exhibit smooth changes in properties such as conductivity, reflectance and index of refraction with increased temperatures.

Figure 1:
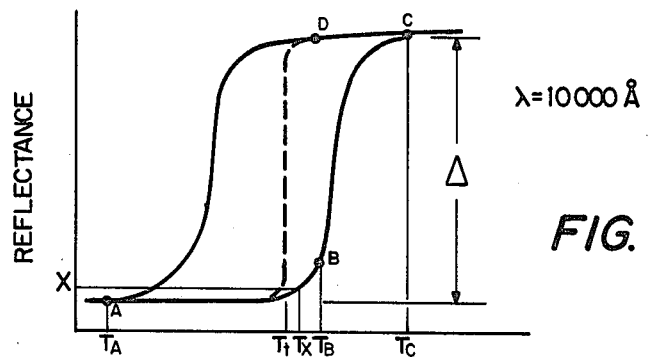
FIG. 1 is a graph of the reflectance of a thin film of vanadium dioxide at a wavelength of 10 microns as a function of temperature.

In applications such as modulation of light, reflectance is the physical property of primary interest. FIG. 1 shows the reflectance of a thin film of vanadium dioxide, one member of this class of materials, as a function of temperature. Although all members of the class exhibit similar optical properties at different transition temperatures, vanadium dioxide is probably most practical in such applications because its transition temperature is approximately 67° C. Other members of the class have the following transition temperatures: vanadium sesquioxide ($V_2O_3$), −123° C.; and one of the titanium oxides, ($Ti_4O_7$), −123° C. and −153° C. These materials may be practical in special applications as, for example, in high and low temperature environments.

Referring to FIG. 1, point A on the curve represents the reflectance of a thin film of vanadium dioxide which is initially at a temperature well below the transition temperature, $T_t$ of the film. Although strictly speaking the film itself has no single transition temperature because it is an aggregation of crystallites having different transition temperatures, the mean transition temperature of the crystallites is taken as the transition temperature of the film. If the film is heated by application of thermal energy to some temperature $T_B$, the reflectance of the film will gradually increase to a point B on the curve. As the temperature exceeds the transition temperature $T_t$, which for vanadium dioxide is approximately 67° C., the reflectance will rapidly increase as the film is switched to its metal state. When the transition temperature of the film is greatly exceeded by some temperature $T_C$, the film will have relatively high reflectance, as indicated by point C on the curve. When the temperature of the film is lowered, such as by ordinary radiative cooling following heating, the film exhibits a reflectance shown graphically by the upper portion of the curve in FIG. 1. As the film is cooled from temperature $T_C$ back to temperature $T_B$, the material retains its relatively high reflectance as shown by point D on the upper portion of the reflectance curve. The film is thus bistable for certain temperatures within the hysteresis loop, having two markedly different values of reflectance depending upon the thermal history of the material. To reduce the reflectance of the film back to that of the surrounding area, the temperature of the region must be lowered to some point below the hysteresis loop, such as temperature $T_A$, which corresponds to a point A of low reflectance on the curve.

The particular wavelengths for which vanadium oxide thin films will evidence such changes in reflectance depend upon the choice of material since the absorption characteristics of the vanadium oxides are different. For example, the absorption edge of vanadium dioxide in its semiconductor state is approximately 1 micron, which makes it especially suitable for applications in the infrared. Since vanadium dioxide films at infrared wavelengths are not highly absorbing in the semiconductor state, but highly absorbing in the metal state, significant changes in reflectance can be produced by switching between states.

Figure 2:
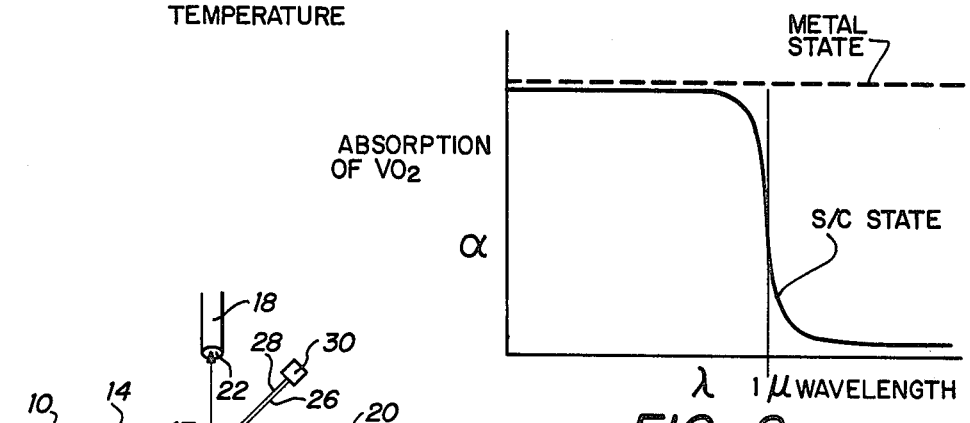
FIG. 2 is a graph of the absorption of a thin film of vanadium dioxide as a function of temperature for both the semiconductor and metal states.

FIG. 2 illustrates the absorption characteristics of a vanadium dioxide thin film. At relatively short wavelengths, such as in the visible, $VO_2$ has relatively high absorption in both the metal and semiconductor states so that switching between states at wavelengths in the visible is not practical. However, since vanadium dioxide has a band edge at about one micron, it has relatively low absorption and therefore relatively high transmission at wavelengths in the infrared. Films of 5000 Å–10000 Å in thickness provide sufficient absorption in the metal state to obtain the relatively high reflectance desired, while keeping absorption in the semiconductor state at a minimum.

Figure 3:
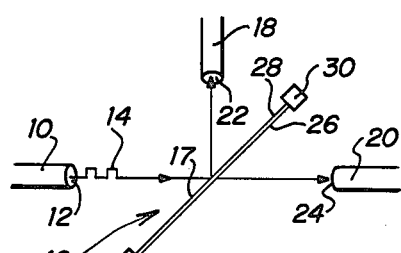
FIG. 3 is a schematic representation of the first embodiment of the present invention.

Referring now to FIG. 3, an apparatus is shown for switching the light between optical fibers. A conventional input optical fiber 10 having a relatively flat endface 12 carries a modulated light signal 14 which exits normal to endface 12. Modulated signal 14 is incident on a high speed beam splitter 16 which can be operated in either of two modes, a reflecting mode and a transmitting mode, (i.e. in the metal or semiconductor state) to switch signal 14 to one of two output optical fibers 18 and 20. In the preferred embodiment, the incident surface 17 of the beam splitter is disposed at approximately a 45 degree angle to the path of signal 14, although any orientation of fibers 10, 18 and 20 is possible which satisfies the laws of reflection and refraction. In the preferred embodiment, optical output fiber 18 is disposed perpendicular to the path of modulated signal 14 as it exits from fiber 10 such that when beam splitter 16 is operated in its reflecting mode, signal 14 is reflected from the incident surface normal to the endface 22 of output fiber 18. In the preferred embodiment, the second output fiber 20 is positioned just behind beam splitter 16, such that when beam splitter 16 is in its transmission mode, signal 14 will be transmitted through beam splitter 16 normal to the endface 24 of output fiber 20.

Beam splitter 16 consists of a substrate 26 having relatively high transmission and high thermal conductivity, upon which is deposited a vanadium oxide thin film 28. In the preferred embodiment, sapphire provides an exemplary material for substrate 26 because of its transmission and thermal conductivity characteristics. In most applications, a thin film of vanadium dioxide approximately 5000 Å–10000 Å thick will provide a sufficiently high transmission to reflectance ratio at infrared wavelengths to make beam splitting feasible. Vanadium dioxide is the material of choice for most applications because its transition temperature is approximately 67° C., requiring relatively little thermal energy to maintain and switch the film about the transition temperature. As earlier indicated, the vanadium dioxide film can be switched to either the reflecting mode by heating the film above its transition temperature $T_t$ near the edge of the loop to achieve high reflectance or well below the transition temperature to its transmission mode by cooling it near the other end of the hysteresis loop.

In the present invention, the thermal heating and cooling required to switch the vanadium dioxide film between its reflecting transmission modes is provided by a series of thermoelectric junctions 30 placed in thermal contact with the side edges of sapphire substrate 26 so as not to impede the transmission of light through the substrate. Thermoelectric junctions 30 are standard solid state elements available, for example, from Borg Warner Corporation, of Des Plaines, Ill. In such devices, the heat flow toward or away from the junction is proportional to the current supplied or withdrawn, so that the temperature of the film can be controlled by varying the magnitude and direction of the current in the junction. A current control device 32, such as a potentiometer or a switching circuit, varies the current as necessary for particular applications. The thermoelectric junctions 30 can heat and cool the film at relatively high speeds; used in conjunction with the present invention it would be expected to provide switching speeds on the order of about 178 millisecond. By thus controlling the current in the thermoelectric junctions 30, via control 32, it is possible to switch a modulated signal 14 between output fibers 18 and 20 at high speeds and without movement of mechanical parts.

For vanadium dioxide thin films having thicknesses between 5000 Å and 10000 Å it is possible to obtain greater than 95% transmission in the semiconductor state and about $10^{-4}\%$ transmission when switched to the metal state at wavelengths of 10 microns. This makes it possible to achieve a transmission to reflectance ratio in the infrared from about 1 to 1,000 to about 1 to 10,000 at switching speeds on the order 0.5 milliseconds.

While optimal high reflectance can be obtained by heating vanadium dioxide thin films sufficiently far above the transition temperature, i.e., outside the hysteresis loop as shown in FIG. 1, it will be observed that any given degree of reflectance less than optimum can be achieved by heating the film to some intermediate temperature inside the loop. At any such intermediate temperature, the film will reflect some fraction of the incident light given by the curve in FIG. 1 and will transmit most of the remaining light with relatively low loss at these low reflectances. Some of the features of the first embodiment of the invention are based upon this concept of heating the film to a temperature inside the loop to "tap off" a small fraction of the light for sampling or other purposes.

Referring again to FIGS. 1 and 3, control 32 is designed to provide sufficient current to thermoelectric junctions 30 such that the temperature of the film will be maintained at some temperature $T_x$ not far above the transition temperature whereby the film will have a reflectance X (FIG. 1), which will be some fraction of the optimum achievable reflectance.

At temperature $T_x$, the film reflects fraction X of the incident light from beam splitter 16 into output fiber 18 and permits most of the remaining light to pass through the beam splitter as long as the reflectance is kept relatively small. Because most of the crystallites in the film are in their low absorption state at temperature $T_x$, light passing through film 28 will sustain low loss due to absorption and most of it will be directed onto the endface of output fiber 20. By thus controlling the current in the thermoelectric junctions, it is possible to "tap" off a fraction of the modulated signal 14, for sampling or monitoring purposes, or for other applications, such as, for example, in cable television in which these taps may be serially cascaded along the signal path.

By designing the control 32 to include a programmable tap, any desired fraction of signal 14 may be "tapped off" for sampling or other purposes. The tap is programmable by providing the control 32 with the capacity to vary the magnitude and direction of the current in junctions 30 to obtain any desired reflectance in the film and thus tap off any predetermined fraction of the signal.

Figure 4:
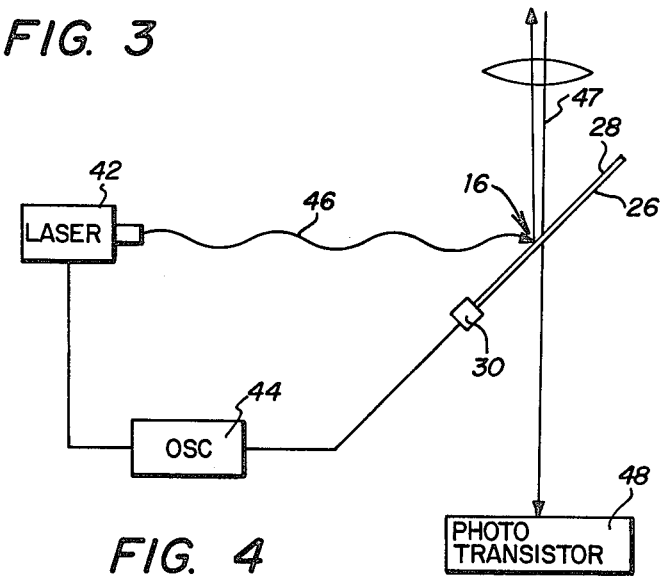
FIG. 4 is a schematic representation of the second embodiment of the present invention.

FIG. 4 represents a second embodiment of the invention utilizing the same beam splitter 16 of the embodiment illustrated in FIG. 3 in transmit-receive switch for a laser radar. An infrared laser 42 is turned on and off by oscillator 44 which also supplies a signal to thermoelectric junctions 30 disposed around the edges of the sapphire substrate 26 upon which a thin film of vanadium dioxide 28 is disposed. The oscillator provides a signal to thermoelectric junctions 30 disposed around the edge of the substrate to heat the film to its reflecting state when the laser 42 is on and to cool the film to its transmitting state by causing current to flow in the opposite direction so that the film will be in a transmitting mode for receiving a reflected pulse. Oscillator 44 turns on laser 42 which sends a pulse 46 to beam splitter 16 in its reflecting state whereby pulse 46 is reflected out into the world. If pulse 46 strikes an object and is reflected back into the system, it will pass through beam splitter 16 which is in its transparent state. The reflected pulse 47, if any, then passes through beam splitter 16 for detection by a phototransistor 48 or other sensing apparatus.

While the preferred embodiment using a vanadium dioxide film requires laser radiation in the infrared, other vanadium oxide films can be used in other applications which will dictate the use of a laser radiation of other wavelengths.

Although particular embodiments of the invention have been illustrated in the drawings and described herein, it will be understood that the invention is not limited to the embodiments disclosed but is capable of rearrangement, modification and substitution of parts and elements without departing from the spirit of the invention.

I claim:

1. A substantially lossless switch for switching a light signal between optical fibers comprising:
    an input optical fiber carrying a modulated light signal having a wavelength above the absorption edge of vanadium oxide;
    a vanadium oxide thin film disposed in the path of the light signal, said film being switchable between its semiconductor and metal state and transmitting substantially all of the light signal incident thereon when said film is in its semiconductor state and reflecting substantially all of the light signal incident thereon when said film is switched to its metal state;
    first and second output optical fibers for selectively receiving light from said input fiber, said first output fiber oriented relative to said film and also to said input fiber such that a light signal from said input fiber incident on said film in its semiconductor state is transmitted through said film into said first output fiber, said second output fiber oriented relative to said film and also to said input fiber such that light incident on said film in its metal state is substantially reflected into said second output fiber; and
    control means for selectively heating or cooling said film above or below its transition temperature to switch said film between its semiconductor and metal states.

2. The apparatus of claim 1 wherein said film is vanadium dioxide.

3. The apparatus of claim 1 wherein said control means includes a plurality of thermoelectric junctions in thermal contact with said film for selectively heating and cooling said film above and below its transition temperature; and
- control means for selectively switching current to and from said junctions for heating and cooling said film.

4. A substantially lossless switch for switching a modulated light signal between optical fibers comprising:
- an input optical fiber for carrying a modulated infrared signal having a wavelength above the absorption edge of vandium oxide;
- a dielectric substrate positioned in the path of said light signal, said substrate having relatively high transmission and relatively high thermal conductivity;
- a vanadium dioxide thin film disposed on the surface of said substrate, said film having a thickness of between about 5000 A to about 10000 A, said film capable of being switched between semiconductor and metal states, said film transmitting substantially all of the light signal incident thereon in its semiconductor state and reflecting substantially all of the light signal incident thereon in its metal state;
- first and second output optical fibers for selectively receiving light from said input fiber;
- said first output fiber disposed behind said film and oriented relative to said input fiber such that light incident on said film in its semiconductor state is substantially transmitted through said film into said first output fiber;
- said second output fiber oriented relative to said film and to said input fiber such that light incident on said film in its metal state is substantially reflected into said second output fiber;
- a plurality of thermoelectric junctions disposed around the side edges of said substrate in thermal contact with said substrate, said junctions capable of heating or cooling said substrate and said film by directing an electric current into or away from each of said junctions; and
- control means for directing a current into or away from each of said junctions for selectively heating and cooling said substrate and said film.

5. A substantially lossless tap for sampling an optical fiber comprising:
- an input optical fiber carrying a modulated light having a wavelength above the absorption edge of vanadium oxide;
- a vanadium oxide thin film disposed in the path of the signal, said film experiencing a continuous increase in reflectance with increases in temperature near its transition temperature;
- first and second output optical fibers for receiving the light signal from said input fiber;
- said first fiber is disposed behind said film and oriented relative to said input fiber such that said light signal carried by said fiber incident on said film is substantially transmitted through said film into said first output fiber;
- said second output fiber oriented relative to said film and to said input fiber such that a portion of said light signal incident on said film is partially reflected into said second output fiber;
- heating means in thermal contact with said film for maintaining said film at a predetermined constant temperature; and
- control means connected to said heating means for selectively controlling the temperature of said film above or below its transition temperature.

6. The tap of claim 5 wherein said heating means contains a thermoelectric junction and said control means is capable of varying the current of said junction.

7. The tap of claim 5 wherein said film is vanadium dioxide.

8. A substantially lossless programmable tap for an optical fiber comprising:
- an input optical fiber for carrying a modulated infrared light signal having a wavelength above the absorption edge of vanadium dixoide;
- a dielectric substrate positioned in the path of said light signal, said substrate having relatively high transmission and relatively high thermal conductivity;
- a vanadium dioxide thin film disposed on the surface of said substrate, said film having a thickness of between 5000 A to 10000 A, said film experiencing a continuous increase in reflectance with increases in temperature near its transition temperature;
- first and second output optical fibers for receiving a light signal from said input fiber;
- said first output fiber disposed behind said film and oriented relative to said input fiber such that the light signal incident on and transmitted through said film passes through said substrate into said first output fiber;
- said second output fiber positioned relative to said film and to said input fiber such that a predetermined fraction of said light signal reflected from said film passes into said second output fiber;
- a plurality of thermoelectric junctions disposed around the edge of said substrate in thermal contact with said substrate and said film for maintaining said film at a preselected temperature to reflect a predetermined fraction of said light signal from said film; and
- a control means connected to said thermoelectric junctions for selectively supplying current to said junctions to maintain said film at a preselected temperature to reflect a predetermined fraction of said signal to said second output fiber.

9. A transmit-receive switch for a laser radar for sending an output pulse into the world and detecting a reflected pulse comprising:
- a source of laser light having a wavelength above the absorption edge of vanadium oxide;
- a vanadium oxide thin film disposed in the path of said laser lights capable of transmitting substantially all of the light signal incident thereon when said film is in its semiconductor state and capable of relfecting substantially all of the light signal incident thereon out into the world when said film is in its metal state, said film being switchable between its semiconductor and metal state by varying the temperature thereof above or below its transition temperature;
- switching means capable of selectively raising and lowering the temperature of said film above and below the transition temperature for selectively reflecting said laser pulse into the world by switching said film to its metal state and for selectively receiving a reflected pulse from the world by switching said film to its semiconductor state permitting said pulse to be transmitted through said film;

timing means connected to said switchng means for switching said film at preselected times; and sensing means disposed behind said film for sensing a reflected pulse passing through said film in its transparent state.

10. The transmit-receive switch of claim 9 wherein said film is vanadium dioxide.

11. The transmit-receive switch of claim 9 wherein said switching means includes a plurality of thermoelectric junctions in thermal contact with said film.

* * * * *